(12) United States Patent
Khan

(10) Patent No.: US 8,518,243 B2
(45) Date of Patent: Aug. 27, 2013

(54) METHOD FOR UTILIZING HYDROCARBON WASTE MATERIALS AS FUEL AND FEEDSTOCK

(75) Inventor: M. Rashid Khan, Dhahran (SA)

(73) Assignee: Saudi Arabian Oil Company (SA)

( * ) Notice: Subject to any disclaimer, the term of this patent is extended or adjusted under 35 U.S.C. 154(b) by 1872 days.

(21) Appl. No.: 10/957,488

(22) Filed: Oct. 1, 2004

(65) Prior Publication Data

US 2006/0070912 A1    Apr. 6, 2006

(51) Int. Cl.
 *C10G 21/00* (2006.01)
 *C10G 31/10* (2006.01)

(52) U.S. Cl.
 USPC .......................................... 208/179; 208/180

(58) Field of Classification Search
 USPC .................... 208/13, 177, 179, 180
 See application file for complete search history.

(56) References Cited

U.S. PATENT DOCUMENTS

| | | | |
|---|---|---|---|
| 3,684,699 A | 8/1972 | Vermeulen et al. | |
| 3,692,668 A | 9/1972 | McCoy et al. | |
| 4,518,483 A * | 5/1985 | Dickakian ........................ | 208/44 |
| 4,544,491 A * | 10/1985 | Tyson et al. .................... | 208/179 |
| 4,812,225 A | 3/1989 | Corti et al. | |
| 4,938,876 A | 7/1990 | Ohsol | |
| 5,186,817 A * | 2/1993 | Paspek et al. ................. | 208/188 |
| 5,188,739 A | 2/1993 | Khan et al. | |
| 5,188,741 A | 2/1993 | Zang et al. | |
| 5,211,724 A | 5/1993 | Khan et al. | |
| 5,234,468 A | 8/1993 | Khan | |
| 5,234,469 A | 8/1993 | Khan et al. | |
| 5,264,009 A | 11/1993 | Khan | |
| 5,266,085 A | 11/1993 | McMahon et al. | |
| 5,273,556 A | 12/1993 | McMahon et al. | |
| 5,356,540 A | 10/1994 | Khan et al. | |
| 5,882,506 A | 3/1999 | Ohsol | |
| 5,948,242 A * | 9/1999 | Ohsol et al. .................... | 208/181 |
| 6,187,172 B1 * | 2/2001 | Plummer ........................ | 208/44 |

FOREIGN PATENT DOCUMENTS

EP    0173574 A2    3/1986

OTHER PUBLICATIONS

IPCS listing for "gasoline" available at http://www.inchem.org/documents/icsc/icsc/eics1400.htm (Oct. 2001).*
IPCS listing for "kerosene" available at http://www.inchem.org/documents/icsc/icsc/eics0663.htm (Nov. 1998).*
"Petroleum" in Kirk-Othmer Encyclopedia of Chemical Technology (May 19, 2009), pp. 1-15.*

* cited by examiner

*Primary Examiner* — Randy Boyer
(74) *Attorney, Agent, or Firm* — Bracewell & Giuliani LLP

(57) ABSTRACT

The fuel properties of petroleum hydrocarbon waste having an API gravity varying from about 5 to 30 are improved by heating the hydrocarbon to a temperature of about 35° C. to 90° C. and mixing the heated hydrocarbon stream with a suitable solvent to reduce the viscosity of the hydrocarbon, which is then separated by a centrifuge to obtain an aqueous phase stream, an oil phase stream, and a separated solids stream. The oil phase stream has a viscosity range of about 250 centipoise (cP) to about 1000 cP. The oil phase stream is utilized in a refinery, while a slurry fuel is prepared with the separated solids stream and aqueous phase stream as a feedstock for road asphalt, a fuel for a combustor, or a fuel for a gasification process. The oil phase stream is used for fuels and feedstock for making carbon fiber.

39 Claims, 1 Drawing Sheet

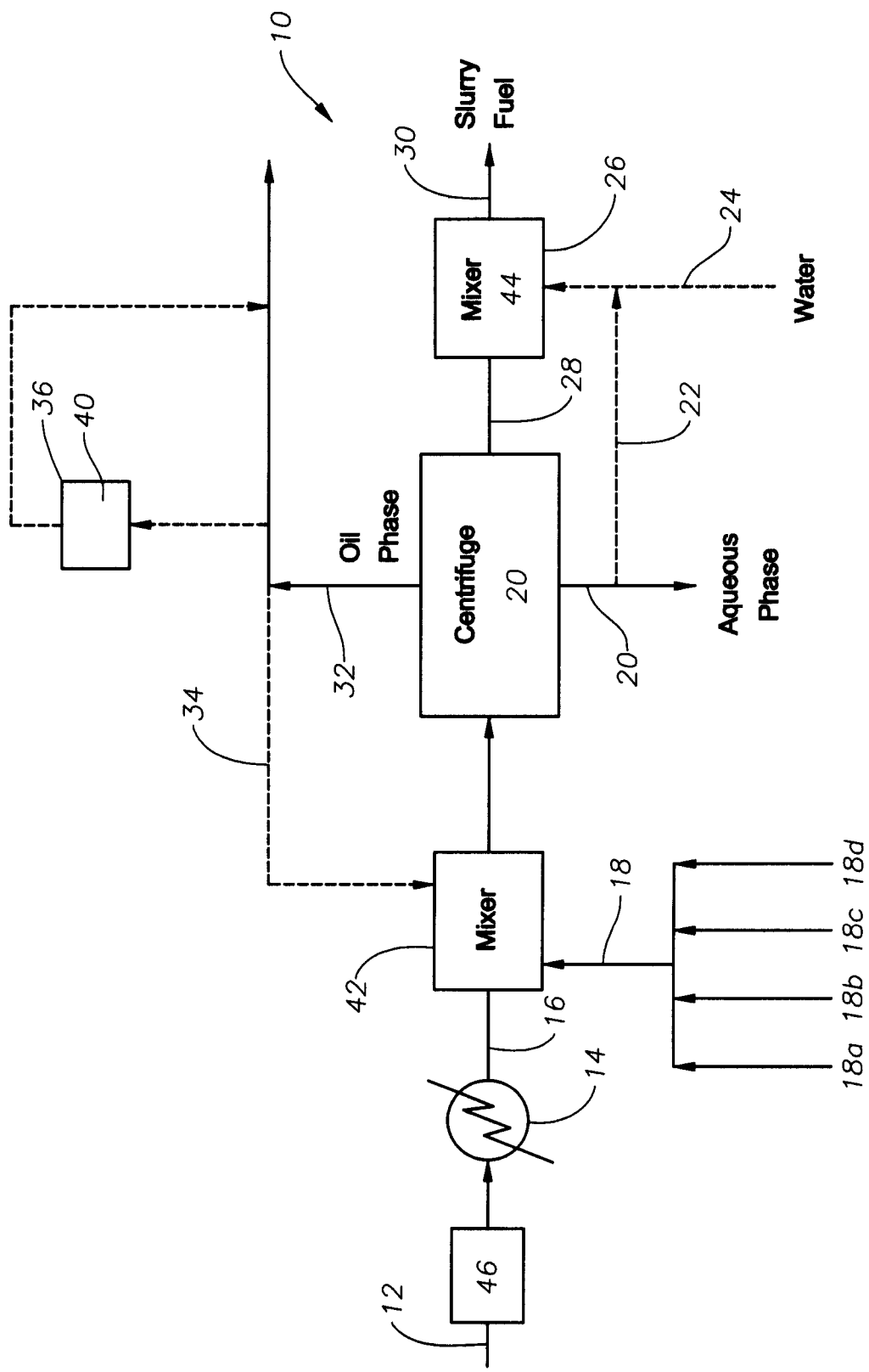

METHOD FOR UTILIZING HYDROCARBON WASTE MATERIALS AS FUEL AND FEEDSTOCK

BACKGROUND OF THE INVENTION

1. Field of the Invention

The present invention relates to using hydrocarbon waste materials, more specifically, heavy petroleum hydrocarbons including petroleum sludge, tank bottoms, or residue having an API gravity of about five to about thirty into useful fuels and products.

2. Background of the Invention

Oil producers generate significant amounts of petroleum waste materials. For example, operating companies generate a significant volume of petroleum waste materials, including thousands of cubic meters of oily wastes annually, much of which are tank bottoms sludge and various refinery and production wastes. Furthermore, various amounts of non-leaded hydrocarbon products, waste solvents, and slop oil waste materials are generated. These waste materials are often contaminated by water and insoluble solids. Some of these sludges contain between fifty to ninety percent oil. The annual disposal costs for these materials can be a significant operating expense to operating companies, which is lost. Much of these materials are now "land-farmed" creating potential environmental problems. In the USA and elsewhere, such disposal techniques are believed to have led to highly toxic superfund sites. Furthermore, local regulations are expected to limit or eliminate land farming in the near future. Therefore, it is important that proper steps are taken to utilize or dispose of such waste materials.

Heavy residue, petroleum waste, and sludge materials are formed during production, handling, and processing of the petroleum hydrocarbons. The transportation and use of the heavy hydrocarbons are difficult because of their high viscosity and poor stability. At ambient conditions, heavy hydrocarbons, such as a refinery residue, have an API gravity of about thirty or less. These oily materials are often contaminated with solid or semi-solid waste materials and water.

Due to improvements in the refining processes over the past fifty years, additional lighter products are being recovered from every barrel of hydrocarbon waste oil. Thus, the residue and heavy materials, such as bunker fuel, being produced in various refineries are undergoing significant changes in quality including a greater concentration of asphaltenes. The presence of a larger concentration of asphaltenes in fuels has a great impact on fuel usage in various applications. Asphaltenes are polar compounds that tend to agglomerate into very large structures in liquid hydrocarbons. These agglomerates lead to viscosities that are much higher than if the asphaltenes were not structured. The asphaltene molecule appears to carry a core of approximately five stacked flat sheets of condensed aromatic rings, one above the other giving an overall height of sixteen to eighteen Angstroms. The average sheet diameter appears to range from six to fourteen Angstroms. The molecular weight of petroleum asphaltenes can range from about 1,000 to 50,000. A refinery residue after it is extracted with a solvent exists in a solid state such that its viscosity cannot be measured, and one has to heat the material at a sufficiently high temperature (>100° C.) to make this material into a low viscosity material suitable for transport.

In storage tanks or tankers, fuel sludge, tank bottom, etc. are formed when asphaltenes are separated from the fuel and deposited on the bottom of the tank. Furthermore, fuel sludges are formed when different fuels including residual fuels are blended when one of the components contains significant amount of asphaltene. In hydrocarbon waste upgraded by hydrotreating and hydrocracking processes, the relatively unreactive portion of the hydrocarbon waste, termed "residue," can be formed, which requires further processing. Refinery wastes, tank bottoms sludge, waste solvents, slop oil, lube oil waste, and other hydrocarbon waste produced during refining are environmentally hazardous and can create a disposal problem. In blending of different hydrocarbon wastes or hydrocarbon waste products, asphaltene/resin ratio is altered and fuels become unstable as asphaltenes separate and agglomerate. Furthermore, as stated earlier, fuel sludges are formed when different fuels including residual fuels are blended, especially when one of the components contains higher amounts of asphaltenes. During transportation, asphaltenes deposit and clog reservoir pores and pipelines. Utilization of hydrocarbon waste involves various steps such as storage, transportation, and combustion, partial oxidation or further refining and the like. The presence of asphaltenes can affect each of these steps.

U.S. Pat. No. 5,133,781 issued to DeRosa et al. discloses a method of stabilizing asphaltenes in hydrocarbons by dissolving the asphaltenes in tetrahydrofuran, phosphochlorinating the asphaltenes, and then reacting the phosphochlorinated-asphaltenes with equimolar amounts of aliphatic or aromatic alcohols. The '781 patent stabilizes the asphaltenes for use in bituminous liquids until well into the refining process.

Attempts have been made to convert sewage sludge waste into useful fuels. As an example, in U.S. Pat. No. 5,356,540 issued to Khan, a pumpable aqueous slurry of sewage sludge is produced by the step of dewatering the sewage sludge to produce an aqueous slurry having a solids content of about 10 to 25 wt. %. The aqueous slurry of sewage sludge is then pretreated to improve its slurrying characteristics by one or a combination of (a) heating, (b) hydrothermal treatment, and (c) heating, mixing and shearing the aqueous slurry of sewage sludge. The following materials are then mixed together at a temperature in the range of about ambient to 400° F. to produce a pumpable aqueous slurry having a solids content in the range of about 30 to 65 wt. %: (a) pretreated aqueous slurry of sewage sludge; (b) a nonionic water-soluble alkoxylated alkylphenol additive; and (c) sewage sludge-containing material and/or solid carbonaceous fuel-containing material to increase the solids loading. When using the techniques taught by this patent with industrial hydrocarbon sludge streams, the effects are often limited in duration.

Introduction into refining, partial oxidation (gasification), or combustion processes are possible avenues to dispose of petroleum hydrocarbons, such as tank bottoms sludge or residue. Having 5% by weight or greater asphaltene concentration in asphaltene-rich hydrocarbons, however, tends to cause difficulties in pumping, fuel injections, atomization, spray and combustion or partial oxidation. Asphaltene rich particles have a long burning time, which results in larger flame size. Combustion ignition is delayed for these fuels. In a combustion chamber, unburned carbon and soot are produced. Other difficulties include excessive wear in piston ring and cylinder liner; fracture of piston rings, and increased deposits on combustion chamber. During combustion, the presence of asphaltenes creates non-homogeneous fuel mixtures that result in a non-uniform spray pattern. Larger fuel particles containing asphaltenes do not atomize or vaporize contributing to incomplete combustion that leads to deposits and various pollutants being formed in the combustion system.

A need exists for a method of utilizing petroleum hydrocarbon wastes that will reduce disposal costs and risks associated with disposal of the hydrocarbon wastes. A goal is to provide a process that utilizes the hydrocarbon waste as a fuel source in a process that will not result in deleterious results within the process. A further goal is to provide a process that efficiently utilizes the asphaltenes contained within hydrocarbon waste streams.

SUMMARY OF THE INVENTION

The present invention advantageously provides a method of utilizing petroleum sludge or a hydrocarbon waste stream as a fuel source without resulting in deleterious results as a result of using such fuel source within the process. Costly pretreatment of the sludge or hydrocarbon waste stream, while acceptable, is not required in the present invention, which results in a cost saving.

In this process, hydrocarbon waste stream is heated and mixed with various additives at a temperature in a range of about 35° C. to 90° C. in the absence of air, while being continuously passed through a centrifuge to separate material into various fractions, namely a separated solids, an aqueous phase, and an oil phase.

Each of the separated solids fraction are preferably used as a fuel source. Separated solids fraction is mixed with water to produce a pumpable slurry fuel having a solids content in a range of about 50 to 60 wt. %. The water can be newly added water from an external source or a portion of aqueous phase or combinations thereof. Pumpable slurry fuel can be burned as fuel in a gasifier, furnace, boiler, incinerator, or the like. Separated solids can also be used as an additive for asphalt. Oil phase is preferably used as a fuel within a refinery. A heavier aromatic portion of the oil phase can serve as a feedstock for making carbon fiber. The suitable boiling fraction that can serve as a feedstock for making carbon fiber is the between 400° C. and 520° C.

Fuel properties of hydrocarbon waste stream having an API gravity varying from about 5 to about 30 are improved by mixing the hydrocarbon waste stream with a diluent solvent sufficient to reduce the viscosity of the hydrocarbon to a range of about 250 centipoise (cP) to about 1000 cP. The mixing is preferably performed at a temperature of about 35° C. to 100° C. The waste material is centrifuged, filtered, and separated into various products or fractions, namely separated solids, aqueous phase, and oil phase. Separated solids contain substantial amounts of asphaltenes. Other additives can be added to hydrocarbon waste stream as described herein.

In addition to the method embodiments, the apparatus useful to perform the methods described herein is also advantageous provided.

BRIEF DESCRIPTION OF THE DRAWINGS

So that the manner in which the features, advantages and objects of the invention, as well as others which will become apparent, may be understood in more detail, more particular description of the invention briefly summarized above may be had by reference to the embodiment thereof which is illustrated in the appended drawings, which form a part of this specification. It is to be noted, however, that the drawings illustrate only a preferred embodiment of the invention and is therefore not to be considered limiting of the invention's scope as it can admit to other equally effective embodiments.

FIG. 1 is a simplified block diagram of a process for utilizing a hydrocarbon waste stream having an API gravity of about 5 to about 30 as a fuel source according to an embodiment of the present invention.

DESCRIPTION OF THE PREFERRED EMBODIMENTS

The present invention advantageously provides a method of utilizing a petroleum waste stream having an API gravity varying from about 5 to about 30 as a fuel source. Table I includes an example composition for petroleum waste stream.

TABLE I

| Component | Feed wt. %, moisture free basis |
|---|---|
| S | 1-7 |
| C | 70-87 |
| H | 7-10 |
| N | 0.1-2 |
| H2O (uncentrifuged) | 5-50 |
| Density (API gravity) | 5-30 |
| Total Distillate (–524 C.) | 20-60 |
| % Asphaltenes | 10-40 |

Referring to FIG. 1, as an embodiment of the present invention, the method preferably includes the step of heating hydrocarbon waste stream 12 to a preferable preselected temperature range of between about 30° C. and about 100° C. in the absence of air. This step of heating lowers viscosity of hydrocarbon waste stream 12 creating warmed hydrocarbon waste stream 16. The step of heating hydrocarbon waste stream 12 more preferably includes heating hydrocarbon waste stream 12 to a heated temperature within a range of about 50° C. to about 100° C.

After being heated, warmed hydrocarbon waste stream 16 is then mixed with a diluent solvent stream 18a to reduce a viscosity of warmed hydrocarbon waste stream 16 to a reduced viscosity. Once diluent solvent stream 18a has been added, warmed hydrocarbon waste stream 16 is then centrifuged to produce oil phase stream 32, aqueous phase stream 20, and separated solids stream 28, jointly called produced streams or fractions. Each of these produced streams can be collected separately. Separated solids stream 28 contains substantial amounts of asphaltenes. Separated solids stream 28 and water are combined to produce a slurry fuel 30. The water can be newly added water from an external source 24 or a portion of aqueous phase 22 or combinations thereof. Slurry fuel 30 preferably has a solids content of at least 50 weight percent. Slurry fuel 30 is preferably used to produce asphalt or as fuel for a gasification process. Slurry fuel 30 more preferably contains about 50-60 weight percent solids. Oil phase stream 32 preferably is used as a fuel source in refineries. At least a portion of oil phase 34 is preferably recycled as feed to the step of centrifuging warmed hydrocarbon waste stream 16. A heavier aromatic portion of the oil phase stream 32 can serve as a feedstock for making carbon fiber. The suitable boiling fraction of the portion of the oil phase stream 32 that can serve as a feedstock for making carbon fiber is the between 400° C. and 520° C.

The amount of diluent solvent stream 18a added to warmed hydrocarbon waste stream 16 can be chosen to reach a preselected viscosity of oil phase stream 32, or a preselected concentration of asphaltenes in warmed hydrocarbon waste stream 16, based on the type of hydrocarbon waste stream 16. Alternately, the amount of diluent solvent 18a can be determined by optimizing these two factors. Amounts preferably in the range of about 0.005 to about 8 weight percent of diluent solvent stream 18a in warmed hydrocarbon waste stream 16 are preferred. This advantageously provides desirable levels of stability of oil phase stream 32. More preferably, the range is between about 0.5 to about 5.0 weight of diluent solvent stream 18a in warmed hydrocarbon waste stream 16. Even more preferably, the range is between about 1.0 to about 3.0 weight percent. With a warmed hydrocarbon waste stream 16 containing a large concentration of asphaltenes, the concentration of diluent solvent stream 18a is preferably up to 25 weight percent.

Once diluent solvent stream 18a is added to warmed hydrocarbon waste stream 16, a viscosity of warmed hydrocarbon waste stream 16 is reduced. The desired or target viscosity of the oil phase stream 32 will depend on the ultimate use of oil phase stream 32, keeping in mind that a viscosity within the preferably range of about 10 to about 1000 centipoise (cP), and more preferably about 200 to about 900 cP, is preferred at 25 to 70 degree C. for most transportation and utilization purposes.

The viscosity of heavy hydrocarbon stream having an API gravity that ranges from about 5 to about 30 is significantly reduced by exposing the hydrocarbon stream to a diluent solvent stream 18a, followed by separation of the produced streams as discussed above. The combined heating and mixing of warmed hydrocarbon waste stream 16 with the diluent solvent stream 18a produces a hydrocarbon fuel comprising oil phase stream 32 that has a viscosity level that can be conveniently transported through pipelines without deposit formation. Preferred pipeline viscosities range from about 400 cP to about 1000 cP.

Examples of preferred diluents for transportation of hydrocarbon waste oil or refinery waste or residue to a refinery or a utilization site are lighter components of petroleum, such as gasoline, naphtha, diesel fuel, and mixtures thereof. In general, the amount of viscosity reducing additive, or diluent solvent stream 18a, is from about 5 weight percentage to about 50 weight percentage, and more preferably about 20 weight percentage to about 35 weight percentage, of warmed hydrocarbon waste stream 16. About 20 weight percentage to 35 weight percentage of diesel, gasoline and naphtha is typically sufficient to reduce the viscosity of warmed hydrocarbon waste stream 16 to less than about 1000 cP to less than about 600 cP at 35° C. In preferred embodiments of the present invention, hydrocarbon waste stream 12 is preferably selected from the group consisting of petroleum heavy hydrocarbon waste, tank bottom, petroleum heavy fractions, bunker fuel, petroleum sludge, refinery waste, and combinations thereof.

Foreign materials or contaminants, such as sand, dirt, and the like, can exist in hydrocarbon waste stream 12. The methods described herein optionally include the step of prefiltering hydrocarbon waste stream 12 prior to the step of heating hydrocarbon waste stream 12 to remove contaminants from hydrocarbon waste stream 12. Alternately, prefiltering can occur prior to centrifugation.

In preferred embodiments of the present invention, diluent solvent stream 18a is preferably selected from the group consisting of gasoline, naphtha, kerosene, diesel fuel, and combinations thereof. Other suitable diluent solvents 18a will be apparent to those of skill in the art and are to be considered within the scope of the present invention.

Slurry fuel 30 produced by mixing separated solids stream 28 with at least a portion of aqueous phase 22 can be used to produce road asphalt. Slurry fuel 30 can also be made by adding an external source of water 24 to separated solids stream 28 or a combination of an external water source 24 and at least a portion of aqueous phase 22. An advantage of using aqueous phase stream 20 is that it reduces the disposal costs associated with disposing of aqueous phase stream 20. Slurry fuel 30 can also be used in gasification processes or combustion processes as a fuel. Separated solids stream 28 can be used as an additive in road asphalt.

To improve the stability of hydrocarbon waste stream 12, an asphaltenes dispersing agent 18b is preferably added to warmed hydrocarbon waste stream 16. In preferred embodiments of the present invention that include adding an asphaltenes dispersing agent 18b to warmed hydrocarbon waste stream 16, asphaltenes dispersing agent 18b is preferably selected from the group consisting of toluene, xylene, tetralin, furan, phenol, ethyl benzoate, butaldehyde, acetophenone, cyclohexanone, and combinations thereof. Asphaltenes dispersing agent 18b is preferably added so that asphaltenes dispersing agent 18b has a concentration of about 0.1 weight percent to about 25 weight percent of warmed hydrocarbon waste stream 16 with dispersing agent. In addition to improving the stability of warmed hydrocarbon waste stream 16, asphaltenes dispersing agent 18b also advantageously enhances the solubility of the asphaltenes, which enhances the yield of oil phase stream 32 that is recoverable from warmed hydrocarbon waste stream 16. Asphaltenes dispersing agent 18b is preferably added to warmed hydrocarbon waste stream 16 using conventional methods at any time during or after centrifugation of warmed hydrocarbon waste stream 16, depending on the nature of the waste.

In preferred embodiments of the present invention, the invention includes the step of adding an emulsion breaker additive 18c to warmed hydrocarbon waste stream 16 so that emulsion breaker additive 18c has a concentration of less than 100 ppm. Chemical emulsion breaker additives 18c disrupt the interfacial tensions between oil and water and allow droplets to coalesce and separate. Suitable emulsion breaker additives 18c for the present invention preferably include nonionic surfactants, polyglycols, polyglycol esters, ethoxylated resins, ethoxylated nonylphenols, polyhydric alcohols, sulfuric acid salts, and combinations thereof. A preferable nonionic surfactant preferably includes a polycrylamide polymer. If oil phase stream 32 is going to subsequently be used in oil field production, emulsion breaker additive 18c preferably has a concentration in a range of about 1 ppm to about 200 ppm. If oil phase stream 32 is going to subsequently be used in refinery desalting processes, emulsion breaker additive 18c preferably has a concentration in a range of about 5 ppm to about 20 ppm.

To facilitate separation of warmed hydrocarbon waste stream 16, a filter aid 18d can be added to warmed hydrocarbon waste stream 16 to aid in the separation of oil phase stream 32 and aqueous phase stream 20. Once added, filter aid 18d preferably has a concentration of less than 1 weight percent of warmed hydrocarbon waste stream 16. Filter aid 18d is preferably selected from the group consisting of diatomite, siliceous materials, cellulose materials, and combinations thereof. Commercial filter aids 18d are available from companies, such as Aderco Chemical Products Inc. headquartered in Quebec.

The extent of fuel properties improvements made to hydrocarbon waste stream 12 can be optimized based on the time/duration/type of additive and the nature and type of additive as well as the degree of desired separation. The effect of viscosity reduction is retained for at least seven days.

As another embodiment of the present invention, a method for utilizing a hydrocarbon waste stream having an API gravity varying from about 5 to about 30 is advantageously provided. In this embodiment, hydrocarbon waste stream 12 is heated preferably in a temperature range of about 35° C. to about 100° C. in the absence of air, and more preferably in a range of about 50° C. to about 90° C.

Warmed hydrocarbon waste stream 16 with then mixed with a solvent 18 that is preferably selected from the group consisting of diluent solvent stream 18a, asphaltenes dispersing agent 18b, emulsion breaker additive 18c, filter aid 18d, and combinations thereof. Warmed hydrocarbon waste stream 16 is then preferably centrifuged to produce oil phase stream 32, aqueous phase stream 20, and separated solids stream 28.

Separated solids stream 28 and water 24 are mixed to form a slurry fuel 30 that has a solids content at least 50 wt %. The water can be newly added water from an external source 24 or a portion of aqueous phase 22 or combinations thereof. Oil phase stream 32 can be used as a fuel in a refinery. Slurry fuel 30 can be used as an additive for asphalt. Slurry fuel 30 can also be used as fuel in combustion and gasification processes. At least a portion of oil phase 34 can be recycled within the process as a feed for the step of centrifuging warmed hydrocarbon waste stream 16.

In addition to the method embodiments of the present invention, an apparatus embodiment is also advantageously provided, as shown in FIG. 1. In this embodiment, the apparatus 10 preferably includes a heater 14, a centrifuge 20, and a mixer 42. Heater 14 is preferably used for heating hydrocarbon waste stream 12 in the temperature range between about 35° C. and about 100° C. in the absence of air. Mixer 42 is preferably used for mixing warmed hydrocarbon waste stream 16 with solvent 18 that is preferably selected from the group consisting of diluent solvent stream 18a, asphaltenes dispersing agent 18b, emulsion breaker additive 18c, a filter aid 18d, and combinations thereof. Centrifuge 20 is preferably used for centrifuging warmed hydrocarbon waste stream 16 to produce oil phase stream 32, aqueous phase stream 20, and separated solids stream 28.

An additional mixer 44 can be provided for mixing separated solids stream 28 with at least a portion of aqueous phase 22 to produce slurry fuel 30 having a solids content at least 50 weight percent, and more preferably in the range of about 50 to about 60 weight percent.

Heater 14, first mixer 42, and centrifuge 20 can be combined in a single three phase centrifuge 20. Other suitable types of equipment that can function as heater 14, first mixer 42, second mixer 44, and centrifuge 20 will be known to those of skill in the art and are to be considered within the scope of the present invention. For example, embodiments including a mixer can include any device capable of mixing two or more compounds together.

In preferred embodiments of the present invention, the present invention preferably includes a prefilter for prefiltering hydrocarbon waste stream 12 prior to heating hydrocarbon waste stream 12 to remove contaminants from hydrocarbon waste stream 12.

Each of the fractions collected from the step of centrifuging warmed hydrocarbon waste stream 16 can be used in subsequent processes. For example, a catalyst 40 preferably in a reactor 36 can be added to oil phase stream 32 to produce a fuel that can be used within refineries. Catalyst 40 is preferably selected from the group consisting of molybdenum, iron, cobalt, nickel, vanadium, and combinations thereof. The type of catalyst 40 that is added will depend upon the type of process in which the fuel will be used. Once added, catalyst 40 preferably has a concentration of less than 1 weight percent of the produced fuel.

As an advantage of the present invention, the processes described herein can be used with a variety of hydrocarbon waste streams and can be controlled based upon the ultimate final use of oil phase stream 32 and slurry fuel 30. As another advantage, the processes described herein convert substantially all of hydrocarbon waste stream 12 into useful produced streams. As a result, disposal costs normally associated with disposal of hydrocarbon waste stream 12 are virtually eliminated.

Another advantage of the present invention is that the reduction of viscosity of hydrocarbon waste stream 12 lasts substantially longer than the reduction of viscosity obtained from the application of heat alone. The reduced viscosity attained through heating alone will revert to its original viscosity after the heat has been removed from hydrocarbon waste stream 12 and it has been allowed to cool to ambient temperature. Here, the reduction in viscosity lasts substantially longer than by heating alone.

While the invention has been shown or described in only some of its forms, it should be apparent to those skilled in the art that it is not so limited, but is susceptible to various changes without departing from the scope of the invention.

For example, the centrifuging steps can be effectuated with a three-phase centrifuge, a series of centrifuges, or the like. As another example, slurry fuel 30 can be used for other uses besides for asphalt. Other modifications, such as adding an external source of water to make slurry fuel 30, are to be considered within the scope of the present invention. As another example, the mixers can include a pipeline that enables two or more compounds to combine.

What is claimed:

1. A method for utilizing a hydrocarbon waste stream having an API gravity varying from about 5 to about 30, the method comprising the steps of:
    (a) heating the hydrocarbon waste stream to a preselected temperature range in the absence of air to produce a heated hydrocarbon waste stream, wherein the hydrocarbon waste stream is a stream containing heavy hydrocarbon components resulting from refining and containing a significant amount of asphaltene;
    (b) mixing the heated hydrocarbon waste stream with a diluent solvent stream to reduce viscosity of the heated hydrocarbon waste stream to a reduced viscosity;
    (c) centrifuging the heated hydrocarbon waste stream to produce an oil phase stream, an aqueous phase stream, and separated solids stream; and
    (d) mixing the separated solids stream and water to produce a slurry fuel that has a solids content of at least 50 weight percent,
    wherein the preselected temperature range of step (a) is above about 30° C. and below the boiling point of the diluent solvent stream at atmospheric conditions.

2. The method of claim 1, wherein at least a portion of the water is supplied by at least a portion of the aqueous phase stream to produce the slurry fuel.

3. The method of claim 1, wherein the separated solids stream comprise asphaltenes.

4. The method of claim 1, wherein the step of mixing the hydrocarbon waste stream with a diluent includes retaining the reduced viscosity for at least seven days.

5. The method of claim 1, further including the step of prefiltering the hydrocarbon waste stream prior to the step of heating the hydrocarbon waste stream to remove contaminants from the hydrocarbon waste stream.

6. The method of claim 5, further including the step of adding a filter aid to facilitate separation of the hydrocarbon waste stream and wherein the filter aid has a concentration of less than 1 weight percent.

7. The method of claim 6, wherein the filter aid is selected from the group consisting of diatomite, siliceous materials, cellulose materials, and combinations thereof.

8. The method of claim 1, wherein the diluent solvent stream is selected from the group consisting of gasoline, naphtha, kerosene, diesel fuel, and combinations thereof.

9. The method of claim 1, wherein the slurry fuel is used in a process selected from road asphalt production, a combustion process, and a gasification process.

10. The method of claim 1, further including the step of adding an emulsion breaker additive selected from the group consisting of nonionic surfactants, polyglycols, polyglycol esters, ethoxylated resins, ethoxylated nonylphenols, polyhydric alcohols, sulfuric acid salts, and combinations thereof.

11. The method of claim 10, wherein the emulsion breaker additive has a concentration in a range of about 1 ppm by weight to about 200 ppm by weight.

12. The method of claim 10, wherein the emulsion breaker additive has a concentration in a range of about 5 ppm by weight to about 20 ppm by weight.

13. The method in claim 1, further including the step of adding a catalyst selected from the group consisting of molybdenum, iron, cobalt, nickel, vanadium, and combinations thereof to the oil phase stream for use as a fuel, the catalyst being added so that the catalyst has a concentration of less than 1 weight percent.

14. The method of claim 1, wherein the hydrocarbon waste stream is heated to a temperature of about 50° C. to 90° C.

15. The method of claim 1, wherein the step of centrifuging the hydrocarbon waste stream includes utilizing a centrifuge wherein separate oil phase stream, aqueous phase stream, and separated solids stream are collected.

16. The method of claim 1, wherein the separated solids stream are used as an additive for road asphalt.

17. The method of claim 1, wherein the reduced viscosity is in a range of about 10 cP to about 1000 cP.

18. The method of claim 17, wherein the reduced viscosity is in a range of about 200 cP to about 900 cP.

19. A method for utilizing a hydrocarbon waste stream having an API gravity varying from about 5 to about 30, the method comprising the steps of:
(a) heating the hydrocarbon waste stream to a preselected temperature range in the absence of air to produce a heated hydrocarbon waste stream, wherein the hydrocarbon waste stream is a stream containing heavy hydrocarbon components resulting from refining and containing a significant amount of asphaltene;
(b) mixing the heated hydrocarbon waste stream with a solvent selected from the group consisting of a diluent solvent stream, a dispersant, an asphaltenes dispersing agent, an emulsion breaker additive, a filter aid, and combinations thereof;
(c) centrifuging the heated hydrocarbon waste stream to produce an oil phase stream, an aqueous phase stream, and separated solids stream;
(d) mixing the separated solids stream and water to produce a slurry fuel having a solids content at least 50 weight percent; and
(e) utilizing the hydrocarbon oil as a fuel in a refinery, wherein the preselected temperature range of step (a) is above about 35° C. and below the boiling point of the solvent at atmospheric conditions.

20. The method of claim 19, further including the step of utilizing at least a portion of the hydrocarbon oil as a feedstock for making carbon fiber.

21. The method of claim 20, wherein the portion of the hydrocarbon oil has a boiling fraction in a range of about 400° C. to about 520° C.

22. The method of claim 19, wherein the hydrocarbon waste stream is selected from the group consisting of petroleum heavy hydrocarbon waste, tank bottom, petroleum heavy fractions, bunker fuel, petroleum sludge, refinery waste, and combinations thereof.

23. The method of claim 19, further including the step of prefiltering the hydrocarbon waste stream prior to the step of heating the hydrocarbon waste stream to remove contaminants from the hydrocarbon waste stream.

24. The method of claim 19, wherein the diluent solvent stream is selected from the group consisting of gasoline, naphtha, kerosene, diesel fuel, and combinations thereof.

25. The method of claim 24, wherein the step of adding the diluent solvent stream reduces viscosity of the heated hydrocarbon waste stream to a range of about 10 cP to about 1000 cP.

26. The method of claim 25, wherein the step of adding the diluent solvent stream includes reducing the viscosity of the heated hydrocarbon waste stream for at least seven days.

27. The method of claim 25, wherein the step of adding the diluent solvent stream reduces the viscosity of the heated hydrocarbon waste stream to a range of about 200 cP to about 900 cP.

28. The method of claim 19, wherein the asphaltenes dispersing agent is selected from the group consisting of toluene, xylene, tetralin, furan, phenol, ethyl benzoate, butaldehyde, acetophenone, cyclohexanone, and combinations thereof to the heated hydrocarbon waste stream to improve the stability of the heated hydrocarbon waste stream, the asphaltenes dispersing agent being added so that the asphaltenes dispersing agent has a concentration of about 0.1 weight percent to about 25 weight percent of the heated hydrocarbon waste stream.

29. The method of claim 19, wherein the emulsion breaker additive is selected from the group consisting of nonionic surfactants, polyglycols, polyglycol esters, ethoxylated resins, ethoxylated nonylphenols, polyhydric alcohols, sulfuric acid salts, and combinations thereof.

30. The method of claim 19, wherein the water comprises at least a portion of the aqueous phase stream to produce the slurry fuel and the slurry fuel is used as an additive for road asphalt.

31. The method of claim 1, wherein the hydrocarbon waste stream is selected from the group consisting of petroleum heavy hydrocarbon waste, tank bottoms, refinery waste, petroleum sludge, and combinations thereof.

32. The method of claim 1, further including the step of adding an asphaltenes dispersing agent selected from the group consisting of toluene, xylene, tetralin, furan, phenol, ethyl benzoate, butaldehyde, acetophenone, cyclohexanone, and combinations thereof to the heated hydrocarbon waste stream to improve the stability of the heated hydrocarbon waste stream, the asphaltenes dispersing agent being added so that the asphaltenes dispersing agent has a concentration of about 0.1 weight percent to about 25 weight percent of the heated hydrocarbon waste stream.

33. The method of claim 1, wherein the hydrocarbon waste stream is a residue stream from a hydrotreating or a hydrocracking process.

34. A method for utilizing a hydrocarbon waste stream having an API gravity varying from about 5 to about 30, the method consisting essentially of:
(a) prefiltering the hydrocarbon waste stream to remove contaminants from the hydrocarbon waste stream;
(b) heating the hydrocarbon waste stream after step (a) to a preselected temperature range in the absence of air to produce a heated hydrocarbon waste stream;
(c) mixing the heated hydrocarbon waste stream with a diluent solvent stream to reduce viscosity of the heated hydrocarbon waste stream to a reduced viscosity;

(d) adding an emulsion breaker additive selected from the group consisting of nonionic surfactants, polyglycols, polyglycol esters, ethoxylated resins, ethoxylated nonylphenols, polyhydric alcohols, sulfuric acid salts, and combinations thereof;

(e) centrifuging the heated hydrocarbon waste stream to produce an oil phase stream, an aqueous phase stream, and separated solids stream; and (f) mixing the separated solids stream and water to produce a slurry fuel that has a solids content of at least 50 weight percent, wherein the preselected temperature range of step (b) is above about 35° C. and below the boiling point of the diluent solvent stream at atmospheric conditions.

35. The method of claim 1, wherein the diluent solvent stream is selected from the group consisting of kerosene, diesel fuel, naphtha, and combinations thereof.

36. The method of claim 19, wherein the diluent solvent stream is selected from the group consisting of kerosene, diesel fuel, naphtha, and combinations thereof.

37. The method of claim 34 wherein the diluent solvent stream is selected from the group consisting of kerosene, diesel fuel, naphtha, and combinations thereof.

38. The method of claim 1, wherein the diluent solvent stream has a boiling point that exceeds 100° C. at atmospheric conditions.

39. The method of claim 1, wherein the preselected temperature range of step (a) is between about 30° C. and 100° C., and below the boiling point of the diluent solvent stream at atmospheric conditions.

* * * * *